US008494459B2

(12) United States Patent
Prasad et al.

(10) Patent No.: US 8,494,459 B2
(45) Date of Patent: Jul. 23, 2013

(54) WIDEBAND CODEBOOK CONSTRUCTION AND APPLICATIONS

(75) Inventors: Narayan Prasad, Wyncote, PA (US); Mohammad Amir Khojastepour, Lawrenceville, NJ (US); Sampath Rangarajan, Brigewater, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 129 days.

(21) Appl. No.: 13/213,510

(22) Filed: Aug. 19, 2011

(65) Prior Publication Data

US 2011/0305299 A1 Dec. 15, 2011

Related U.S. Application Data

(60) Continuation-in-part of application No. 13/111,521, filed on May 19, 2011, now Pat. No. 8,254,859, which is a division of application No. 12/026,120, filed on Feb. 5, 2008, now Pat. No. 7,949,318.

(60) Provisional application No. 61/375,322, filed on Aug. 20, 2010, provisional application No. 60/888,193, filed on Feb. 5, 2007.

(51) Int. Cl.
*H04B 7/02* (2006.01)
*H04L 27/28* (2006.01)

(52) U.S. Cl.
USPC ........ 455/101; 455/102; 455/115.1; 375/260; 375/267; 375/296

(58) Field of Classification Search
USPC ............... 455/101, 102, 115.1, 129; 375/260, 375/267, 296, 299
See application file for complete search history.

(56) References Cited

U.S. PATENT DOCUMENTS

| | | | | |
|---|---|---|---|---|
| 7,720,168 | B2 * | 5/2010 | Su et al. | 375/267 |
| 7,839,944 | B2 * | 11/2010 | Lee et al. | 375/267 |
| 7,949,318 | B2 * | 5/2011 | Prasad et al. | 455/129 |
| 8,094,743 | B2 * | 1/2012 | Ahn et al. | 375/267 |
| 8,179,775 | B2 * | 5/2012 | Chen et al. | 370/203 |
| 8,254,492 | B2 * | 8/2012 | Khan et al. | 375/295 |
| 8,254,859 | B2 * | 8/2012 | Khojastepour et al. | 455/129 |
| 2006/0140294 | A1 * | 6/2006 | Hottinen et al. | 375/260 |
| 2008/0198946 | A1 * | 8/2008 | Lee et al. | 375/299 |
| 2009/0117862 | A1 * | 5/2009 | Le Nir et al. | 455/101 |
| 2010/0296591 | A1 * | 11/2010 | Xu et al. | 375/259 |

OTHER PUBLICATIONS

C.R.N. Athaudage, J. Wang and A.D.S. Jayalath, "An Efficient Framework to Exploit Frequency Diversity in OFDM: Precoding with Adaptive Subcarrier Selection", 17th Annual IEEE Int. Symp. on Personal, Indoor and Mobile Radio Communications, 2006.*

* cited by examiner

*Primary Examiner* — Duc M Nguyen
(74) *Attorney, Agent, or Firm* — Joseph Kolodka

(57) ABSTRACT

A precoding scheme in which the downlink channel is estimated and an optimal precoding matrix to be used by the multi antenna transmitter is determined accordingly. The optimal precoding matrix is selected from a codebook of matrices that includes matrices having a structure matched to that of the eigenvectors of the spatial covariance matrix, wherein the spatial covariance matrix is modeled as a Hermitian and Toeplitz matrix parameterized by a single complex-valued scalar.

2 Claims, 7 Drawing Sheets

WIDEBAND CODEBOOK CONSTRUCTION AND APPLICATIONS

CROSS REFERENCE TO RELATED APPLICATIONS

This application is a continuation-in-part of U.S. application Ser. No. 13/111,521, entitled "Enhancing MIMO Transmission", filed May 19, 2011 now U.S. Pat. No. 8,254,859 and this application claims the benefit of U.S. Provisional Application No. 61/375,322, entitled "LTE-A Codebook Structure", filed Aug. 20, 2010; the parent application Ser. No. 13/111,521 is a Division of U.S. application Ser. No. 12/026,120, filed Feb. 5, 2008 now U.S. Pat. No. 7,949,318 which claimed the benefit of U.S. Provisional Application No. 60/888,193, filed Feb. 5, 2007, the contents of all which are incorporated herein.

FIELD OF THE INVENTION

The present invention relates to the field of wireless communications, particularly wireless, high-rate communications using multiple-antenna systems.

BACKGROUND INFORMATION

The hostility of the wireless fading environment and channel variation makes the design of high rate communication systems very challenging. To this end, multiple-antenna systems have been shown to be effective in fading environments by providing significant performance improvements and achievable data rates in comparison to single antenna systems. Wireless communication systems employing multiple antennas both at the transmitter and the receiver demonstrate tremendous potential to meet the spectral efficiency requirements for next generation wireless applications.

Moreover, multiple transmit and receive antennas have become an integral part of the standards of many wireless systems such as cellular systems and wireless LANs. In particular, the recent development of UMTS Terrestrial Radio Access Network (UTRAN) and Evolved-UTRA has raised the need for multiple antenna systems to reach higher user data rates and better quality of service, thereby resulting in an improved overall throughput and better coverage. A number of proposals have discussed and concluded the need for multiple antenna systems to achieve the target spectral efficiency, throughput, and reliability of EUTRA. While these proposals have considered different modes of operation applicable to different scenarios, a basic common factor among them, however, is a feedback strategy to control the transmission rate and possibly a variation in transmission strategy.

The performance gain achieved by multiple antenna system increases when the knowledge of the channel state information (CSI) at each end, either the receiver or transmitter, is increased. Although perfect CSI is desirable, practical systems are usually built only on estimating the CSI at the receiver, and possibly feeding back some representation of the CSI to the transmitter through a feedback link, usually of limited capacity. The transmitter uses the information fed back to adapt the transmission to the estimated channel conditions.

Various beamforming schemes have been proposed for the case of multiple transmit antennas and a single receive antenna, as well as for higher rank MIMO systems, referred to as precoding systems. In precoding systems, independent streams are transmitted along different eigenmodes of the channel resulting in high transmission rates without the need for space-time coding.

In addition to performance considerations, it is also desirable to achieve the highest possible spectral efficiencies in MIMO systems with reasonable receiver and transmitter complexity. Though space-time coding is theoretically capable of delivering very high spectral efficiencies, e.g. hundreds of megabits per second, its implementation becomes increasingly prohibitive as the bandwidth of the system increases.

A need therefore exists for a precoding method that is capable of high throughput yet which can be implemented with reasonable complexity.

SUMMARY OF THE INVENTION

The present invention is directed to quantized, precoding methods and apparatus, and in particular, methods and apparatus for precoding a signal transmitted in an MIMO system using an optimal precoder selected in accordance with a channel quality metric. In an exemplary embodiment, the precoded signal is transmitted in a high-speed downlink from a base station to user equipment (UE) and the channel quality metric includes a channel quality indicator (CQI) that is transmitted to the base station from the UE.

In a further exemplary embodiment, Signal to Interference and Noise Ratio (SINR) information for one or more active downlink streams is used as a channel quality metric in selecting the optimal precoder.

The aforementioned and other features and aspects of the present invention are described in greater detail below.

DETAILED DESCRIPTION

Figure 1:
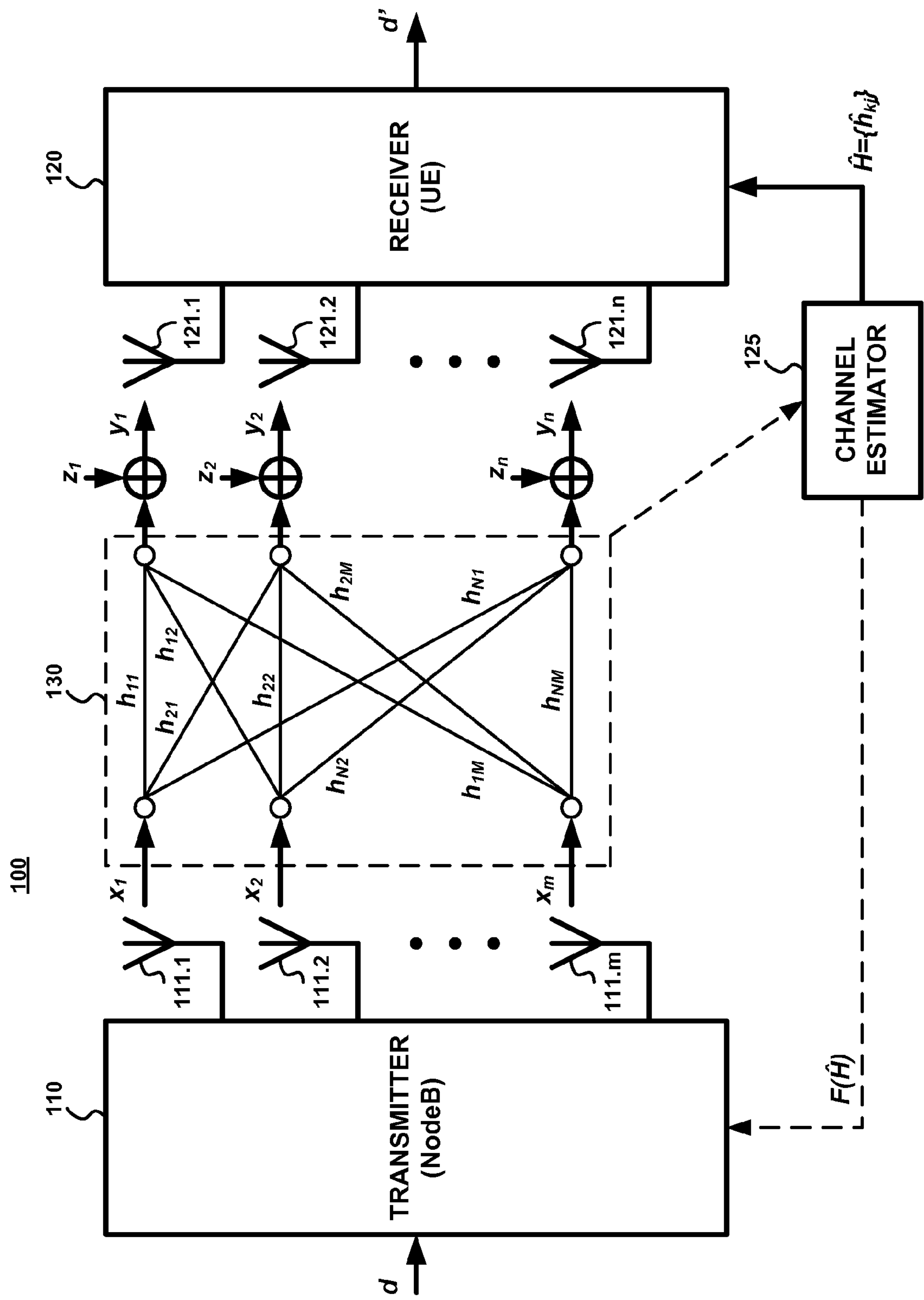
FIG. 1 is a schematic block diagram of a wireless multiple-antenna MIMO communications system with quantized feedback of channel state information.

An exemplary multiple-antenna communication system 100 with quantized feedback is schematically shown in FIG. 1. A transmitter 110, such as at a base station ("NodeB"), transmits from m transmitting antennas 111.1-111.*m* over a fading channel 130 to n receiving antennas 121.1-121.*n* coupled to a receiver 120, such as at user equipment (UE). The system 100 may be, for example, an orthogonal frequency-division multiplexing (OFDM) system, in which each of a plurality of orthogonal sub-carriers is modulated with a conventional modulation scheme, such as quadrature amplitude modulation (QAM), quadrature phase shift keying (QPSK), or the like.

The system 100 also incorporates an exemplary precoding scheme with precoding in accordance with the present invention. The transmitter 110 controls the transmitting antenna outputs in accordance with a set of precoding parameters, or a precoding matrix, which is selected based on an estimate of the channel 130 made at the receiver 120.

At receiver 120, a channel estimator 125 provides an estimate of the channel 130 to the receiver 120. One or more parameters determined as a function of the channel estimate are also provided from the receiver 120 to the transmitter 110 via a feedback channel. In an exemplary embodiment, such fed-back parameters may include a channel quality indicator (CQI) and the index of a recommended preceding matrix that the transmitter 110 should use based on the channel conditions. The determination of this information and its use by the transmitter are described in greater detail below.

For purposes of analysis, a flat fading channel model is assumed in which the channel remains constant for each block of transmission. For a multiple-antenna system with m transmit and n receive antennas the complex baseband channel model can be expressed as follows:

$$y=Hx+z, \quad (1)$$

where x is the m×1 vector of the transmitted signals, y is the n×1 vector of the received signals, H is an n×m matrix representing the channel, and $z\square\mathcal{N}(0,N_0I)$ is the Gaussian noise vector at the receiver.

Figure 2:
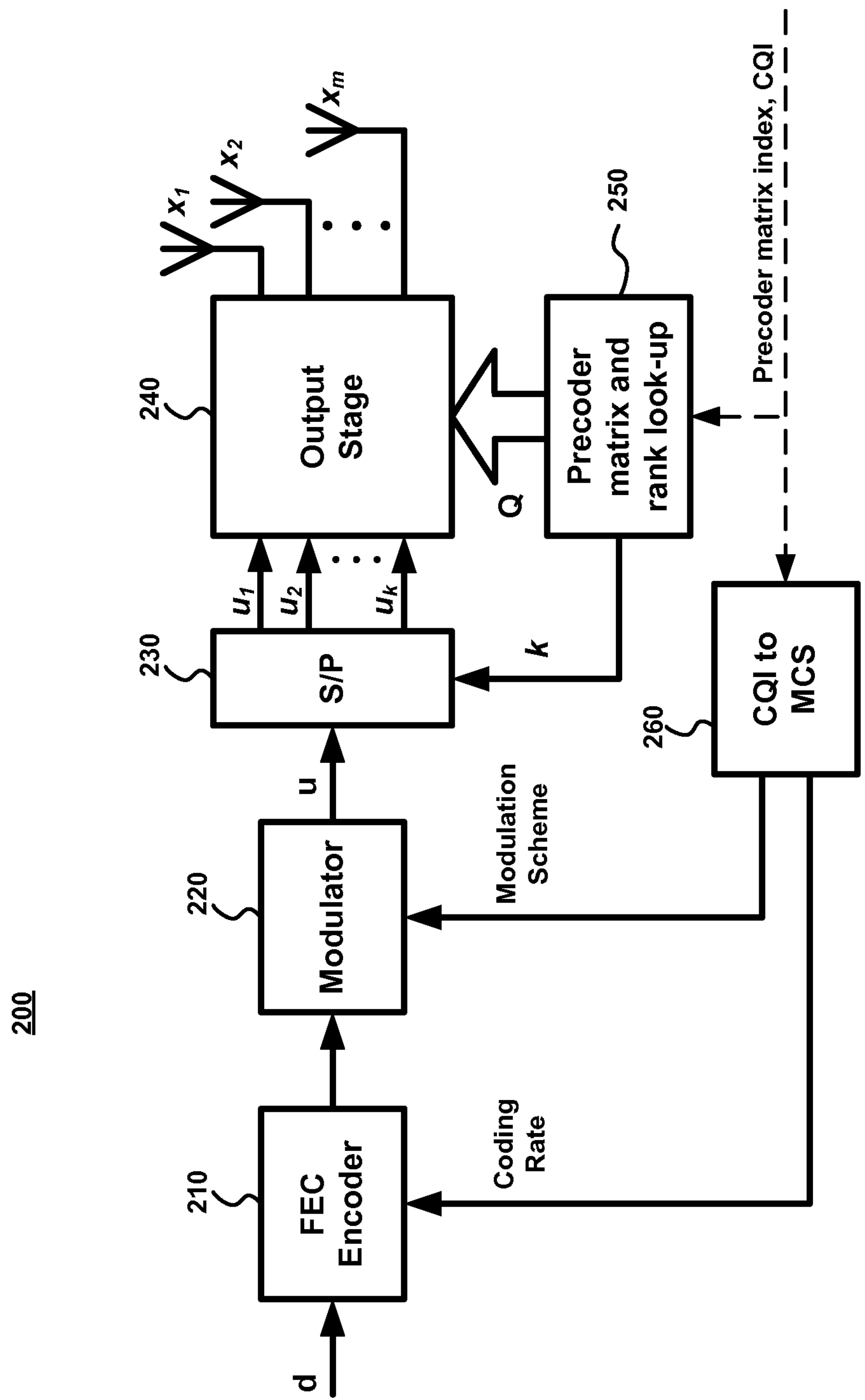
FIG. 2 is a block diagram of an exemplary embodiment of a transmitter in accordance with the present invention.

FIG. 2 shows a block diagram of a transmitter 200 which incorporates an exemplary precoding scheme in accordance with the present invention. A data stream d is first encoded by a forward error correction (FEC) block 210 and then modulated by a modulator 220 to generate modulated symbols u. The symbols u are provided to a serial-to-parallel converter (S/P) 240 which generates k streams of symbols that are to be simultaneously transmitted during the current symbol transmission interval. k is also referred to herein as the beamforming rank. At output stage 240, the symbol streams $u_{1i}$, $u_2, \ldots u_k$, are subjected to pre-coding in accordance with an N×k precoder matrix Q, as follows:

$$x = Qu = \begin{bmatrix} u_1 \\ u_2 \\ \vdots \\ u_k \end{bmatrix} \quad (2)$$

The precoder matrix Q is chosen from a finite set of possible precoder matrices, Q, referred to as the precoding codebook. An exemplary precoding codebook with a specific structure is described in greater detail below.

In the exemplary embodiment shown, the optimal precoder matrix is determined at the UE and an index representative thereof is fed-back to the nodeB transmitter 200. A look-up block 250 uses the index to look-up the corresponding precoder matrix Q and provides Q to the output stage 240 which carries out the operation expressed by Eq. 2 to drive the corresponding m antennas accordingly.

In addition to the precoder matrix index, the UE also feeds back the CQI metric to the nobeB transmitter 200. The CQI is used by a modulation and coding scheme (MCS) block 260 to determine an appropriate MCS corresponding to the value of the CQI that is fed back. The MCS information includes a coding rate for the FEC encoder 210 and a modulation scheme selection for the modulator. Exemplary coding rates may include, for example, 1:3, 1:2, 3:4, 1:1, etc., and exemplary modulation schemes may include QPSK, 16-QAM, 64-QAM, etc.

Figure 3:
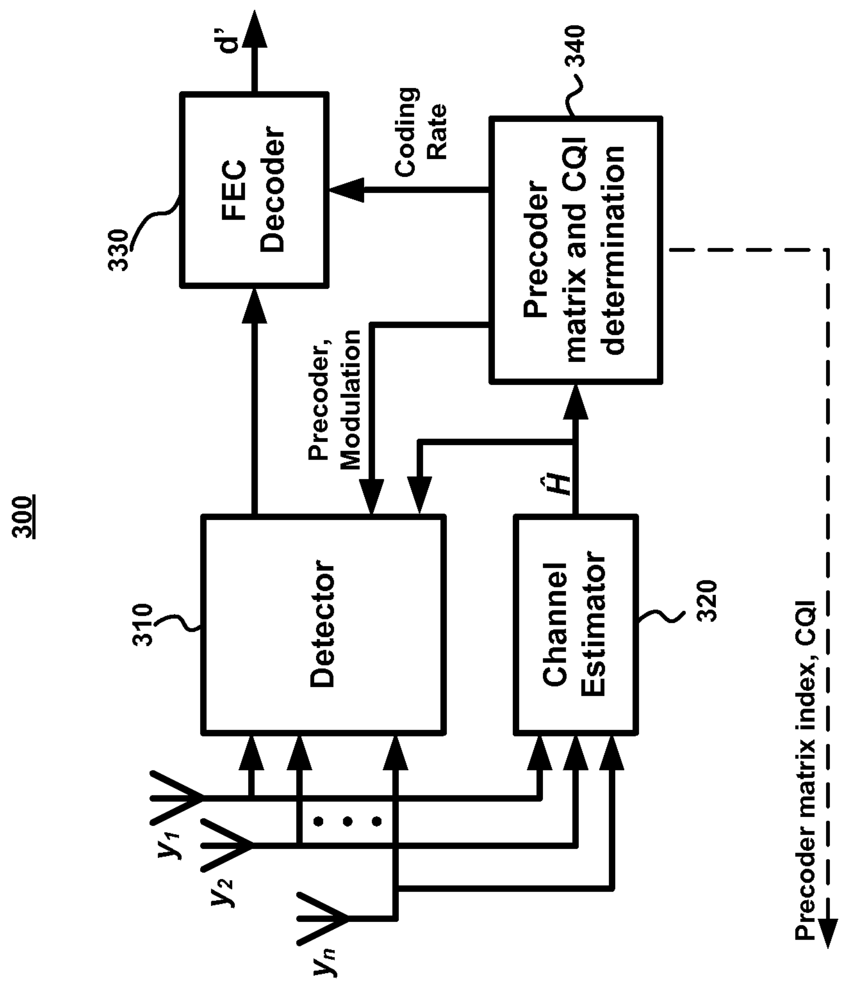
FIG. 3 is a block diagram of an exemplary embodiment of a receiver in accordance with the present invention.

FIG. 3 shows a block diagram of an exemplary embodiment of a receiver 300 for operation with the transmitter 200 of FIG. 2. The signals y received at the antennas of the receiver are provided to a detector 310 and a channel estimator 320. In a preferred embodiment, the detector 310 comprises a Linear Minimum Mean Squared Error (LMMSE) detector, although other detectors may be used. The detector 310 generates a stream of soft outputs or log likelihood ratios which are provided to a FEC decoder 330 which recovers the data stream d'. The channel estimator 320 provides an estimate of the channel to the detector 310 and to a precoder matrix and CQI block 340. As described in greater detail below, the block 340 uses the channel estimate to determine the optimal precoder matrix to be used given the current channel conditions as well as a corresponding value for the CQI metric. The index of the precoder matrix thus determined and the CQI are fed-back to the transmitter, which uses that information as described above. The block 340 also provides the precoder matrix and the modulation scheme selection to the detector 310 and determines a coding rate to be used by the FEC decoder 330. The modulation and the coding rate correspond to the CQI, which is fed-back to the transmitter. The transmitter uses the CQI to determine the same coding rate for the FEC encoder 210 and modulation scheme for the modulator 220 (see FIG. 2).

Codebook

In an exemplary embodiment, a precoding codebook for use with a transmitter having m antennas is described.

We first consider the construction of a precoding codebook which exploits the spatial covariance matrix C=E[H*H] (a.k.a. wideband precoding codebook) where H* denotes the conjugate transpose of H and E[.] denotes the expectation operator. We consider a system with m=N transmit antennas in the uniform linear array (ULA) and assume the following model for the covariance matrix.

$$C=[C_{m,n}]_{n,n=1}^{N}, \quad C_{m,n}=\rho^{|m-1|} \quad \exp(j\theta(m-n)), \quad m,n\in\{1,\ldots,N\}, \quad (1)$$

where $\rho\in[0,1]$& $\theta\in[0,2\pi)$ and $j=\sqrt{-1}\in\mathbb{C}$. Let us define J to be the matrix which has zeros everywhere except on the cross diagonal elements, i.e., $J=[J_{m,n}]$ where $$J_{m,n} = \begin{cases} 1, & n = N-m+1 \\ 0, & \text{otherwise} \end{cases} \quad (2)$$

We offer the following set of properties:

Lemma 1 The matrix C is a Hermitian Toeplitz matrix, i.e., C satisfies $$\tilde{C}=JCJ, \quad (3)$$

where $\tilde{C}$ denotes the conjugate of C.

A vector is said to be Hermitian if $$\tilde{x}=Jx \quad (4)$$

Lemma 2 The eigenspace of any Hermitian Toeplitz matrix can be completely described by Hermitian vectors. In other words, given a Hermitian Toeplitz matrix A and with x being its eigenvector such that $Ax=\lambda x$, then $\exists y$ such that $\tilde{y}=Jy$ with $$Ay=\lambda y \quad (5)$$

Lemma 3 Suppose $\lambda$ is an eigenvalue of a Hermitian Toeplitz matrix A with algebraic multiplicity one. Then if x is an eigenvector such that $Ax=\lambda x$, we must have $$Jx=\exp(j\delta)\tilde{x}. \quad (6)$$

for some $\delta\in[0,2\pi)$.

In practice a correlation matrix realization C is obtained by drawing the variables $\rho,\theta$ from a continuous joint distribution, so all the eigenvalues of C are distinct almost surely.

1 Polarized Setup

Suppose the transmitter has 2N antennas comprising of a pair of N co-polarized antennas each. Then the covariance matrix of each one of these two co-polarized sets is given by C in (1). The overall $2N\times 2N$ covariance matrix $\tilde{C}$ can be written as $$\tilde{C}=\begin{bmatrix} 1 & \alpha \\ \alpha & 1 \end{bmatrix}\otimes C \quad (7)$$

where $\otimes$ denotes the kronecker product and $\alpha\in\mathbb{C}:|\alpha|\in[0,1]$. It can be shown that any eigenvector $\tilde{y}$ of $\tilde{C}$ ahs the form $$\tilde{y}=y\otimes x \quad (8)$$

where $y\in\in\mathbb{C}^{2\times 1}$ is an eigenvector of the matrix $$\begin{bmatrix} 1 & \alpha \\ \alpha & 1 \end{bmatrix}$$

and x is an eigenvector of C. Furthermore, the two eigenvectors of the matrix $$\begin{bmatrix} 1 & \alpha \\ \alpha & 1 \end{bmatrix}$$

are $$\frac{\exp(j\beta)}{\sqrt{2}}\begin{bmatrix} 1 & \frac{\alpha}{|\alpha|} \end{bmatrix}^T$$

and $$\frac{\exp(j\beta)}{\sqrt{2}}\begin{bmatrix} 1 & -\frac{\alpha}{|\alpha|} \end{bmatrix}^T,$$

where $(.)^T$ denotes the transpose operation and the phase term $\exp(j,\beta)$ can be ignored without loss of optimality. The two eigen-values are $1\pm|\alpha|$.

1.1 4 Transmit Antenna ULA

In this section, we consider the case of N=4 co-polarized transmit antennas so we can write the correlation matrix as:

$$C=\begin{bmatrix} 1 & a & a^2 & a^3 \\ b & 1 & a & a^2 \\ b^2 & b & 1 & a \\ b^3 & b^2 & b & 1 \end{bmatrix} \quad (9)$$

where $\alpha\in\mathbb{C}$ such that $|\alpha|\leqq 1$ and $b=\tilde{\alpha}$. Note that the matrix C is Hermitian Toeplitz and is also completely characterized by one complex scalar. Thus its eigenvectors can be expected to have more structure in addition to that possessed by an eigenvector of a general Hermitian Toeplitz matrix. We will also exploit this additional structure in the following. The matrix J for this case can be written as, $$J=\begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

We first consider the case $|\alpha|<1$. In this case, the eigenvectors of any matrix of the form in (9) have the following properties. Consider any matrix C of the form in (9) and let $$C=EAE^\dagger \quad (10)$$

denote its eigen-decomposition where $(.)^\dagger$ denotes the conjugate transpose operation and $A=\mathrm{diag}\{\lambda_1,\lambda_2,\lambda_3,\lambda_4\}$ with $\lambda_1\geqq\lambda_2\geqq\lambda_3\geqq\lambda_4$ denoting the four real-valued eigenvalues. Then, $$E=D_p(H\odot S) \quad (11)$$

where $\odot$ denotes the Hadamard product and $D_p$ is a diagonal matrix of the form $$D_p=\mathrm{diag}\{1,\exp(j\gamma),\exp(2j\gamma),\exp(3j\gamma)\}$$

(12)

for some $\gamma\in[0,2\pi)$. The matrix S has the following structure $$S=\begin{bmatrix} p & r & q & s \\ q & s & p & e \\ q & s & p & r \\ p & r & q & s \end{bmatrix} \quad (13)$$

for some real positive scalars p, q, r, s such that $q=\sqrt{1/2-p^2}$ and $r=\sqrt{1/2-s^2}$. The matrix H is a 4×4 real-valued Hadamard matrix, i.e., columns of H are mutually orthogonal and all its elements belong to the set $\{\pm 1\}$. Then, since each column of E must satisfy the condition in (6), each column of $H=[h_1, \ldots h_4]$ must satisfy the following conditions.

$$h_{1i}h_{1i}=h_{2x}h_{3x},\ \forall i=1,2,3,4. \quad (14)$$

Also, since E must be a unitary matrix, H must also satisfy the following additional conditions.

$$h_{11}h_{12}=-h_{41}h_{42},\ h_{21}h_{22}=-h_{31}h_{32};h_{41}h_{44}=-h_{41}h_{44},\ h_{21}h_{24}=-h_{31}h_{34}h_{22}h_{23}=-h_{32}h_{33},\ h_{12}h_{13}=-h_{42}h_{43};$$

An example H is the following:

$$H=\begin{bmatrix} 1 & 1 & 1 & 1 \\ 1 & -1 & -1 & 1 \\ 1 & 1 & -1 & -1 \\ 1 & -1 & 1 & -1 \end{bmatrix}$$

On the other hand when $|\alpha|=1$ we note that the matrix C is a rank-1 matrix that is given by $$C = \begin{bmatrix} 1 \\ b \\ b^2 \\ b^3 \end{bmatrix} [1 \;\; a \;\; a^2 \;\; a^3]. \tag{15}$$

It can be then shown that the eigen-vector of C corresponding to its one non-zero eigenvalue is of the form $$[1, \exp(j\gamma), \exp(2j\gamma), \exp(3j\gamma)]^T/2 \tag{16}$$

for some $\gamma \in [0,2\pi)$.

1.2 8 Transmit Cross-Polarized Antennas

Suppose now that we have 8 antennas comprising of a pair of 4 co-polarized antennas each. Then utilizing the arguments in Section 1 along with the structure of the eigenvectors derived in Section 1.1, we can deduce that the eight eigenvectors of the 8×8 covariance matrix $\tilde{C}$ can be divided into four pairs of the form $$\frac{1}{\sqrt{2}}\begin{bmatrix} x \\ \exp(j\partial)x \end{bmatrix}, \frac{1}{\sqrt{2}}\begin{bmatrix} x \\ -\exp(j\partial)x \end{bmatrix}, \tag{17}$$

where $$\exp(j\partial) = \frac{|\alpha|}{\alpha}$$

and x is an eigenvector of the 4×4 covariance matrix of the co-polarized antennas. C, whose structure was derived in Section 1.1. The eight eigen-values of $\tilde{C}$ can be divided into four pairs of the form $\{(1+|\alpha|)\lambda_i, (1-|\alpha|)\lambda_i\}_{i=1}^{4}$.

For a highly correlated antenna setup, i.e. $|\alpha|\approx 1$, C is close to singular and indexed three of its four eigenvalues are close to zero. Its dominant eigen-vector can be assumed to have a form as in (16). Further, the two dominant eigenvalues of $\tilde{C}$ are then $\{(1+|\alpha|)\lambda_1, (1-|\alpha|)\lambda_1\}$ with the corresponding eigen-vectors having the form $$[1, \exp(j\gamma), \exp(2j\gamma), \exp(3j\gamma), \exp(j\Theta), \exp(j\Theta)\exp(j\gamma), \exp(j\Theta)\exp(2j\gamma), \exp(j\Theta)\exp(3y\gamma)]^T/2\sqrt{2} \tag{18}$$

and $$[1, \exp(j\gamma), \exp(2j\gamma), \exp(3j\gamma), -\exp(j\Theta), -\exp(j\Theta)\exp(j\gamma), -\exp(j\Theta)\exp(2j\gamma), -\exp(j\Theta)\exp(3j\gamma)]^T/2\sqrt{2}. \tag{19}$$

respectively.

2 8 TX Codebook Construction

Let us consider an 8 TX cross-polarized antenna setup. We note that for a given rank k a codebook consists of a finite set of 8×k semi-unitary matrices. The main aim of such a codebook is to efficiently quantize the k dominant eigenvectors of $\tilde{C}$. The key fact that can be exploited to design a good codebook is to enforce the structure of the eigenvectors of $\tilde{C}$ on the matrices in the codebook. Note that the exact covariance covariance matrix is not known and also that a well designed codebook should work well for several different correlated scenarios, i.e., for several different covariance matrix realizations.

Accordingly, we can construct a rank-1 codebook (which comprises of a finite set of 8×1 vectors) by enforcing the structure given in (18) on each vector in the codebook. This can be accomplished by quantizing and obtaining a few values of γ and Θ and generating vectors using (18). Similarly, for constructing a rank-2 codebook we can enforce that each 8×2 codeword matrix in the codebook have its two columns possessing the form in (18) and (19), respectively. Proceeding this way for the rank k codebook, where $3\leqq k\leqq 8$ we can exploit (17) where x has the structure given in (11).

2.1 Embedding in a Larger Code

In practice the channel matrix realization depends on both the spatial covariance matrix as well as the short-term (a.k.a. fast) fading. Thus, a good codebook needs to accommodate variations in the observed channel matrix on account of fast-fading as well. This can be accomplished by expanding the aforementioned codebook. A useful way to obtain such an expanded codebook is to enforce the structure in (17) in which the 4×4 vector x has the form given in (11) but where H is a complex Hadamard matrix, i.e., i.e., columns of H are mutually orthogonal and all its elements are complex-valued and have a unit magnitude.

Precoder Selection

Figure 4:
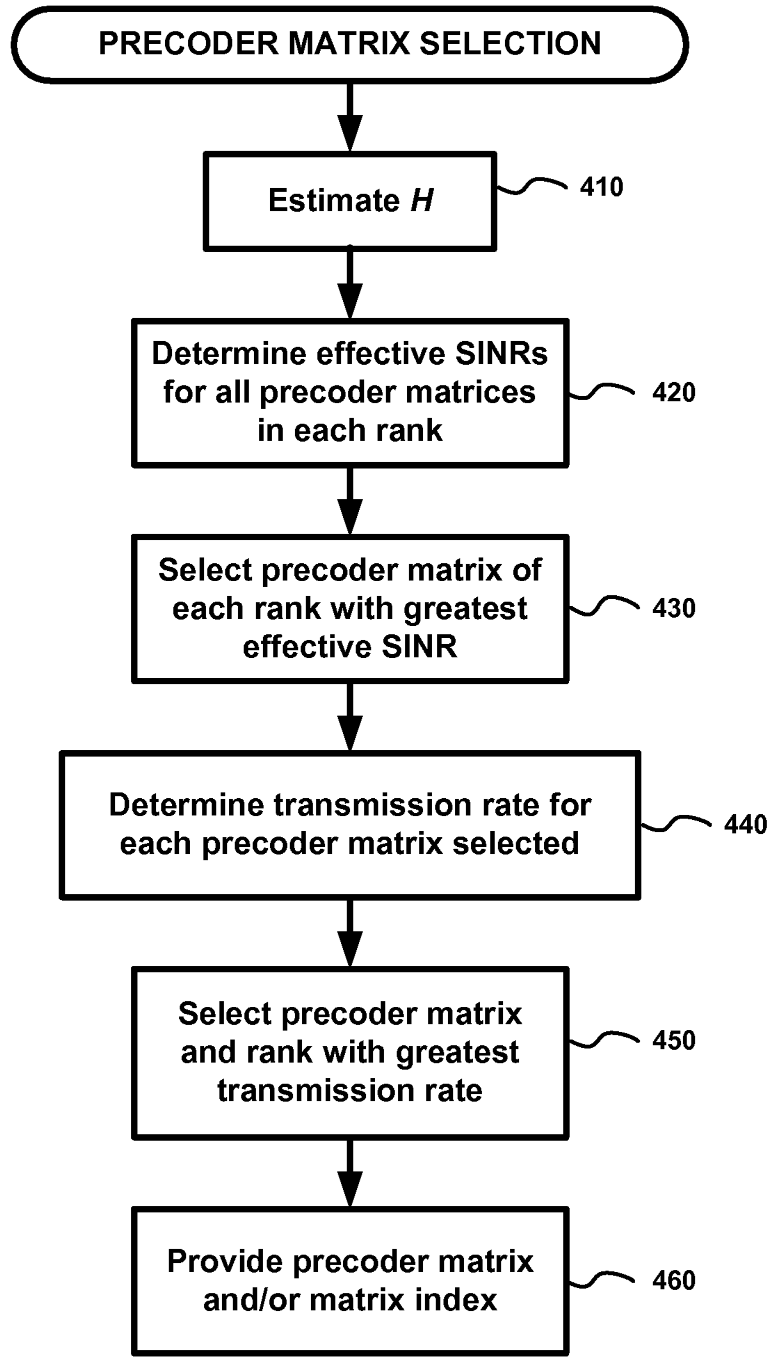
FIG. 4 is a flowchart of an exemplary embodiment of a method of selecting a precoder matrix in accordance with the present invention.

FIG. 4 is a flow chart providing an overview of an exemplary method of selecting the optimal precoder matrix in accordance with the present invention. Further details are set forth below. In an exemplary embodiment, the method shown is carried out at the UE, such as shown in FIG. 3.

As shown in FIG. 4, an estimate of the channel is made at 410, as described in greater detail below. At 420, based on the channel estimate H, an effective SINR is computed for each possible precoder matrix, in each beamforming rank. At 430, the computed effective SINRs are compared and for each rank, the precoder matrix with the greatest corresponding effective SINR is selected. At 440, the transmission rates that are anticipated by using the precoder matrices selected at 430 are determined. At 450, the anticipated transmission rates are compared, and the corresponding precoder matrix (and thus its rank) is selected for implementation. At 460, the selected precoder matrix, or a representation thereof, such as an index, is provided to the transmitter and to the receiver for implementation. The selected precoding rank is implicitly identified with the selected precoder matrix.

As mentioned above, in an exemplary embodiment, the precoder matrix selection takes place at the receiver (e.g., UE) and a representation (e.g., index) of the matrix selected is communicated to the transmitter (e.g., NodeB) via a feedback channel. It is also contemplated by the present invention, however, that this process may be carried out at the transmitter instead.

Multi-codeword Transmission

The exemplary transmitter and receiver described above with reference to FIGS. 2 and 3, respectively, can be readily extended for multi-codeword transmission. For q codeword transmission, where q can be at most m, the number of transmitting antennas, the $p^{th}$ codeword (where $1\leqq p\leqq q$) is transmitted using $k_p$ streams along $k_p$ columns of the precoder matrix. The precoder rank is $$k = \sum_{p=1}^{q} k_p.$$

Furthermore, when the CQI for the $p^{th}$ codeword is below a threshold, $k_p=0$, so that the $p^{th}$ codeword is not transmitted.

For an m×k precoder matrix Q of rank k, a mapping rule decides the split $k \rightarrow (k_1, \ldots, k_q)$ as well as the column indices of Q that the $k_p$ streams of the $p^{th}$ codeword, where $1 \leqq p \leqq q$, should be sent along. For a given precoder matrix, split and choice of column indices, the SINRs for each codeword can be computed using the formulae given above (with simple modifications). Then, for a given precoder matrix, the optimal split and choice of column indices is the one which maximizes the anticipated transmission rate, which itself can be determined from the computed SINRs. Finally, the optimal precoder matrix is the one which along with its optimal split and choice of column indices, yields the highest anticipated transmission rate.

Figure 5:
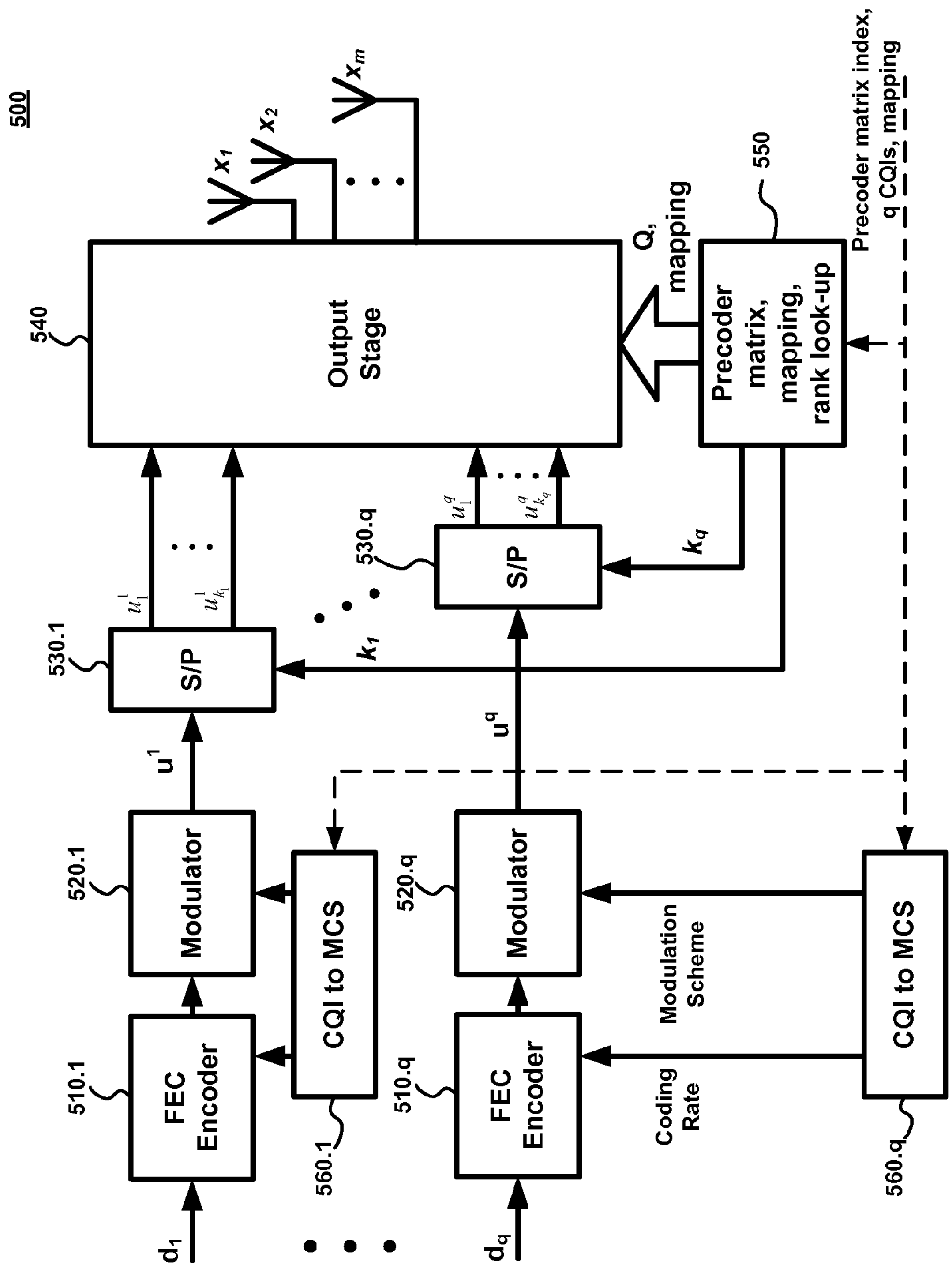
FIG. 5 is a block diagram of an exemplary embodiment of a multi-codeword transmitter in accordance with the present invention.

FIG. 5 shows a block diagram of an exemplary embodiment of a q codeword transmitter 500 based on the architecture of the transmitter 200 shown in FIG. 2. As shown in FIG. 5, each of the q data streams is FEC encoded and modulated independently. Moreover, a CQI for each of the q data streams as well as mapping data are fed-back from the receiver.

Figure 6:
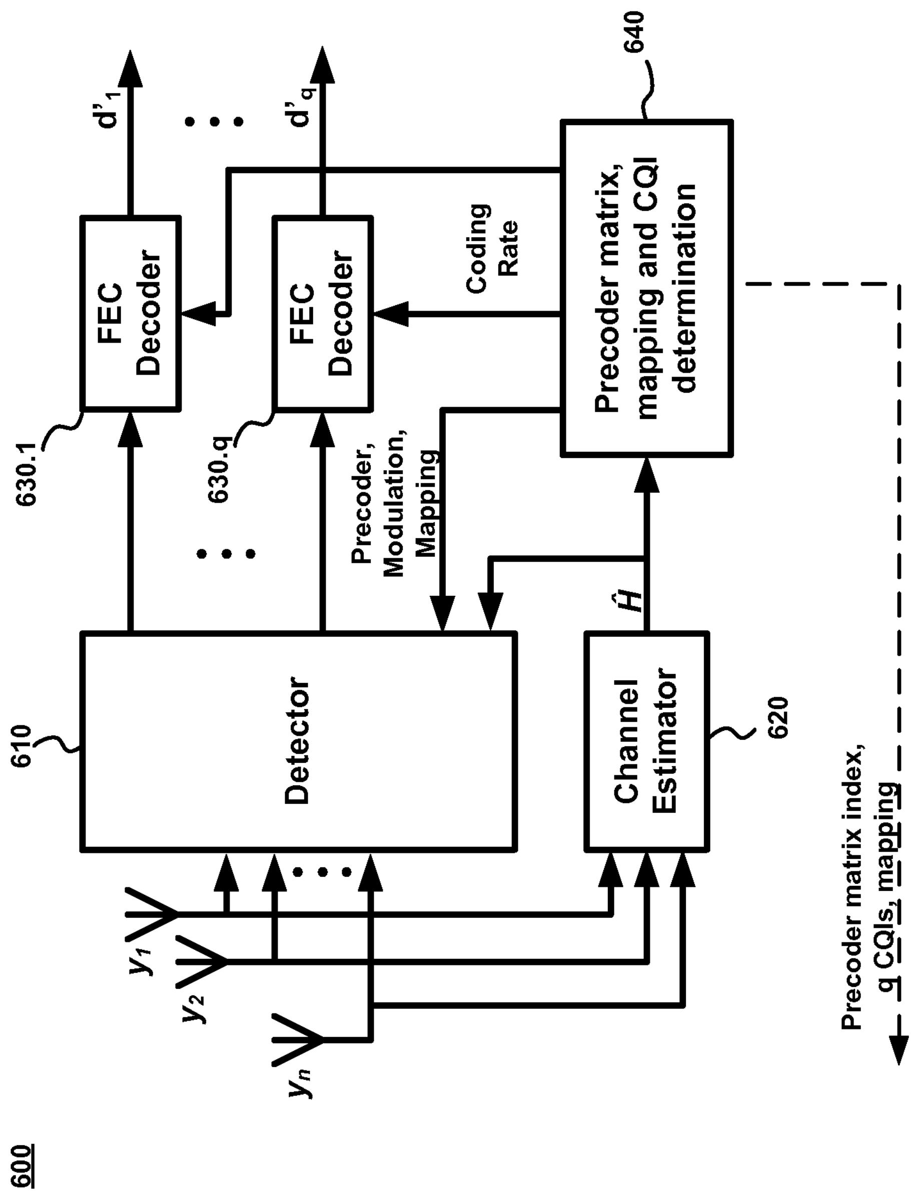
FIG. 6 is a block diagram of an exemplary embodiment of a multi-codeword linear receiver in accordance with the present invention.

FIG. 6 shows a block diagram of an exemplary embodiment of a q codeword linear receiver 600 based on the architecture of the receiver 300 shown in FIG. 3. The receiver 600 can operate with the transmitter 500 of FIG. 5. In this embodiment, the q codewords are demodulated and then FEC decoded independently.

Figure 7:
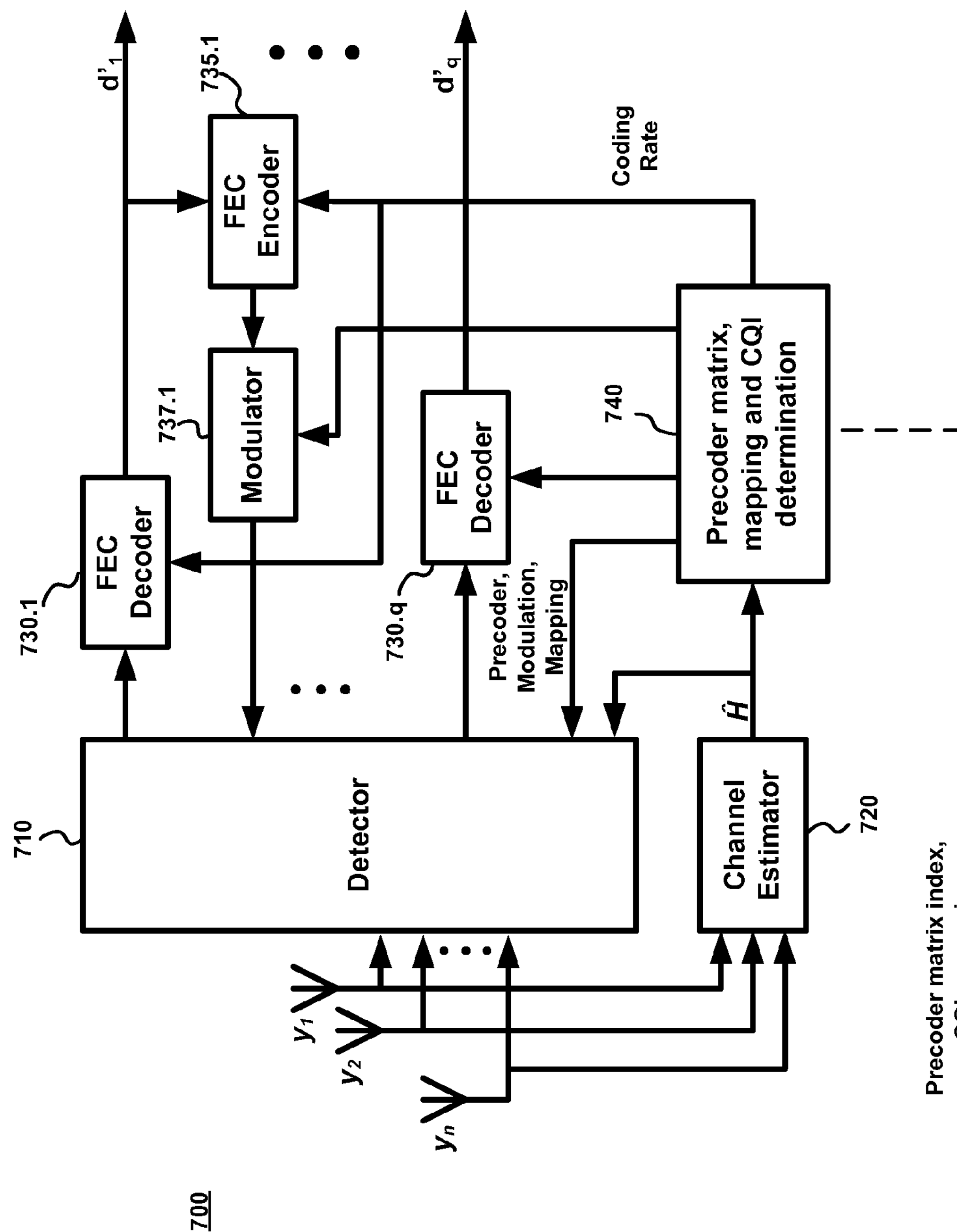
FIG. 7 is a block diagram of an exemplary embodiment of a multi-codeword successive interference canceling receiver in accordance with the present invention.

FIG. 7 shows a block diagram of an exemplary embodiment of a q codeword receiver 700 incorporating successive intereference cancellation (SIC). In this embodiment, each of q−1 recovered data streams, corresponding to codewords 1 through q−1, is re-encoded by a FEC encoder 735 and re-modulated by a modulator 737, and then fed-back to the detector 710.

The mapping information fed back from the receiver includes the split and the choice of column indices. The mapping rule can also be fixed, or varied slowly ("semi-static"). In this case, each m×k precoder matrix Q is associated with one split $(k_1, \ldots, k_q)$ and one choice of column indices. With a fixed or semi-static mapping rule, the receiver need not feed-back mapping information to the transmitter because it can be inferred by the transmitter based on just the precoder matrix index that is fed-back.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of operating a precoding system comprising:

modulating a data signal to generate modulated symbols;

precoding the modulated symbols using a precoder matrix drawn from a plurality of precoder matrices; and transmitting the precoded modulated symbols using eight transmit antennas, wherein the plurality of precoder matrices include:

8×1 vectors having the form $[1, e^{jv}, e^{j2v}, e^{j3v}, e^{j\Theta}, e^{j\Theta}e^{jv}, e^{j\Theta}e^{j2v}, e^{j\Theta}e^{j3v}]^T/2\sqrt{2}$, where $(.)^T$ denotes the transpose operation, $j=\sqrt{-1}$ and $v,\Theta$ are real-valued scalars lying in the interval $[0,2\pi)$ and drawn from a finite set;

8×2 matrices having the form $$\begin{bmatrix} 1, e^{jv}, e^{j2v}, e^{j3v}, e^{j\vartheta}, e^{j\vartheta}, e^{jv}, e^{j\vartheta}e^{j2v}, e^{j\vartheta}e^{j3v} \\ 1, e^{jv}, e^{j2v}, e^{j3v}, -e^{j\vartheta}, -e^{j\vartheta}e^{jv}, -e^{j\vartheta}e^{j2v}, -e^{j\vartheta}e^{j3v} \end{bmatrix}^T \bigg/ 2\sqrt{2}$$

and 8×k matrices for $3 \leqq k \leqq 8$, whose k columns are mutually orthogonal and have the form $[x^T, e^{j\Theta}x^T]^T$ where x is a column of a 4×4 matrix E that can be expanded as $E=D_p(H \oplus Q)$, where $\oplus$ denotes the Hadamard product of matrices, H is a 4×4 real-valued Hadamard matrix, $D_p$ is a 4×4 diagonal matrix of the form $$D_p = \begin{bmatrix} 1 & 0 & 0 & 0 \\ 0 & e^{jv} & 0 & 0 \\ 0 & 0 & e^{j2v} & 0 \\ 0 & 0 & 0 & e^{j3v} \end{bmatrix}$$

and Q is a real-valued 4×4 matrix of the form $$Q = \begin{bmatrix} p & r & q & s \\ q & s & p & r \\ q & s & p & r \\ p & r & q & s \end{bmatrix}$$

such that p, q, r, s are real-valued scalars satisfying $p^2+q^2=r^2+s^2=1/2$.

2. The method of claim 1, wherein said H is a 4×4 complex-valued Hadamard matrix.

* * * * *